(12) United States Patent
Varanasi

(10) Patent No.: US 10,151,861 B2
(45) Date of Patent: Dec. 11, 2018

(54) COATED GLASS ARTICLE AND DISPLAY ASSEMBLY MADE THEREWITH

(71) Applicant: PILKINGTON GROUP LIMITED, Lathom (GB)

(72) Inventor: Srikanth Varanasi, Ottawa Hills, OH (US)

(73) Assignee: Pilkington Group Limited, Lathorn (GB)

( * ) Notice: Subject to any disclaimer, the term of this patent is extended or adjusted under 35 U.S.C. 154(b) by 355 days.

(21) Appl. No.: 14/999,973

(22) PCT Filed: Feb. 10, 2015

(86) PCT No.: PCT/GB2015/050361
§ 371 (c)(1),
(2) Date: Jul. 21, 2016

(87) PCT Pub. No.: WO2015/121632
PCT Pub. Date: Aug. 20, 2015

(65) Prior Publication Data
US 2017/0010393 A1   Jan. 12, 2017

Related U.S. Application Data

(60) Provisional application No. 61/938,290, filed on Feb. 11, 2014.

(51) Int. Cl.
| | | |
|---|---|---|
| *B32B 15/04* | (2006.01) |
| *B32B 17/06* | (2006.01) |
| *G02B 5/08* | (2006.01) |
| *C03C 17/34* | (2006.01) |
| *C03C 17/245* | (2006.01) |
| *H04N 5/64* | (2006.01) |

(52) U.S. Cl.
CPC ........ *G02B 5/0833* (2013.01); *C03C 17/2453* (2013.01); *C03C 17/2456* (2013.01); *C03C 17/3417* (2013.01); *C03C 2217/211* (2013.01); *C03C 2217/212* (2013.01); *C03C 2217/213* (2013.01); *C03C 2217/218* (2013.01); *C03C 2218/1525* (2013.01); *H04N 5/64* (2013.01)

(58) Field of Classification Search
USPC .................. 428/426, 428, 432, 434, 688
See application file for complete search history.

(56) References Cited

U.S. PATENT DOCUMENTS

| | | | |
|---|---|---|---|
| 4,504,526 A | | 3/1985 | Hofer et al. |
| 5,073,451 A | * | 12/1991 | Iida .................. B32B 17/10036 359/359 |
| 5,505,989 A | | 4/1996 | Jenkinson |
| 5,525,406 A | | 6/1996 | Goodman et al. |

(Continued)

*Primary Examiner* — Lauren R Colgan
(74) *Attorney, Agent, or Firm* — Marshall & Melhorn, LLC

(57) ABSTRACT

A coated glass article includes a coating formed over a glass substrate. The coating comprises an optional base layer of an oxide of silicon, a first coating layer of an oxide of titanium, niobium or chromium, a second coating layer of an oxide of silicon, and a third coating layer of an oxide of tin. The coated glass article exhibits a Tvis of 40%-55% and an Rf of 40%-60%. A video display can be mounted behind the coated glass article, such that when the video display is in operation it is visible through the coated glass article and when the video display is not in operation is it concealed by the coated glass article.

14 Claims, 2 Drawing Sheets

(56) References Cited

U.S. PATENT DOCUMENTS

| | | | |
|---|---|---|---|
| 5,580,364 A | 12/1996 | Goodman et al. | |
| 5,745,291 A | 4/1998 | Jenkinson | |
| 5,749,931 A | 5/1998 | Goodman et al. | |
| 5,764,415 A | 6/1998 | Nelson et al. | |
| 5,938,958 A | 8/1999 | Goodman et al. | |
| 6,165,598 A * | 12/2000 | Nelson | C03C 17/3417 428/212 |
| 6,312,131 B1 | 11/2001 | Yamamoto et al. | |
| 6,444,898 B1 * | 9/2002 | Fujisawa | C03C 17/23 136/256 |
| 7,005,188 B2 * | 2/2006 | Anderson | B32B 17/10036 428/432 |
| 7,397,461 B1 | 7/2008 | Graham | |
| 7,820,296 B2 * | 10/2010 | Myli | C03C 17/002 428/428 |
| 8,158,262 B2 | 4/2012 | Varanasi et al. | |
| 8,427,750 B2 * | 4/2013 | Hoeing | B60R 1/12 359/630 |
| 8,534,833 B2 * | 9/2013 | Cado | G02B 1/115 351/159.62 |
| 8,663,787 B2 * | 3/2014 | Coster | C03C 17/2456 428/212 |
| 8,834,976 B2 * | 9/2014 | Lemmer | C03C 17/3681 428/34 |
| 9,332,862 B2 * | 5/2016 | Nunez-Regueiro | C03C 3/087 |
| 2003/0179343 A1 * | 9/2003 | Marechal | G02B 1/116 351/159.62 |
| 2003/0215648 A1 * | 11/2003 | Varanasi | C03C 17/3417 428/432 |
| 2004/0086723 A1 * | 5/2004 | Thomsen | C03C 17/36 428/426 |
| 2006/0065299 A1 * | 3/2006 | Fukawa | C03C 17/3417 136/256 |
| 2007/0009747 A1 * | 1/2007 | Medwick | C03C 17/36 428/432 |
| 2009/0011206 A1 * | 1/2009 | Schutz | C03C 17/3417 428/216 |
| 2009/0025791 A1 * | 1/2009 | Matsui | H01L 31/022466 136/261 |
| 2009/0263596 A1 * | 10/2009 | Lao | C03C 17/36 428/34 |
| 2010/0255225 A1 * | 10/2010 | Cording | C03C 17/3417 428/34 |
| 2010/0279144 A1 * | 11/2010 | Frank | C03C 17/36 428/623 |
| 2011/0210656 A1 * | 9/2011 | Lemmer | E06B 3/6715 312/405 |
| 2011/0212279 A1 * | 9/2011 | Lemmer | C03C 17/3435 428/34 |
| 2011/0212311 A1 * | 9/2011 | Lemmer | C03C 17/3417 428/212 |
| 2013/0164464 A1 * | 6/2013 | Lage | C03C 17/36 428/34 |

* cited by examiner

COATED GLASS ARTICLE AND DISPLAY ASSEMBLY MADE THEREWITH

CROSS-REFERENCE TO RELATED APPLICATION

This application is claiming the benefit, under 35 U.S. C. 119(e), of the provisional application which was granted Ser. No. 61/938,290 and filed on Feb. 11, 2014, the entire disclosure of which is hereby incorporated by reference.

BACKGROUND OF THE INVENTION

The invention relates to a coated glass article having similar visible light transmittance and reflectance properties. The invention also relates to a display assembly comprising the coated glass article and a method of making such a video display assembly.

Flat screen video displays are now found in many locations in public and commercial facilities and in private homes. It has been found to be desirable for such video displays to be less obtrusive when the display is not in operation. One way to accomplish this objective is to conceal the video display by giving it the appearance of an object that might commonly appear in a room, such as a mirror. A known product that has been found to be suitable for such an application is sold by Pilkington North America, Inc. as Pilkington Mirroview™. This product includes a clear glass substrate provided with a coating stack formed of a layer silicon on the glass, a layer of silica on the layer of silicon, and a layer of tin oxide on the silica, providing a visible light transmittance of about 20% and a film side reflectance of 70-75%.

However, under certain conditions, such as for example when there are relatively high levels of natural light illuminating a space and the video display is in operation, the quality of the video image through this product is not as bright or sharp as would be desirable. Thus, it would be advantageous to provide a coated glass article that has a mirror-like appearance for concealing a video display when the display is not in use and permits a video image from the display to be bright and sharp when the display is in use and utilized in areas with high levels of natural light. Additionally, a display assembly comprising the coated glass article would also be desirable.

BRIEF SUMMARY OF THE INVENTION

In accordance with the invention, a coated glass article comprises a glass substrate and a coating formed over the glass substrate. The coating comprises an optional base layer of an oxide of silicon deposited over a major surface of the glass substrate, a first coating layer of an oxide of titanium, niobium or chromium deposited over the optional base layer, a second coating layer of an oxide of silicon deposited over the first coating layer, and a third coating layer of an oxide of tin deposited over the second coating layer. The coated glass article of the invention exhibits a Tvis of 40%-55% and an Rf of 40%-60%.

Also provided is a display assembly, comprising the coated glass article and a method of making such a video display assembly. According to the method of the invention, a video display is mounted behind a coated glass article of the invention, such that when the video display is in operation it is visible through the coated glass article and when the video display is not in operation is it concealed by the coated glass article.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
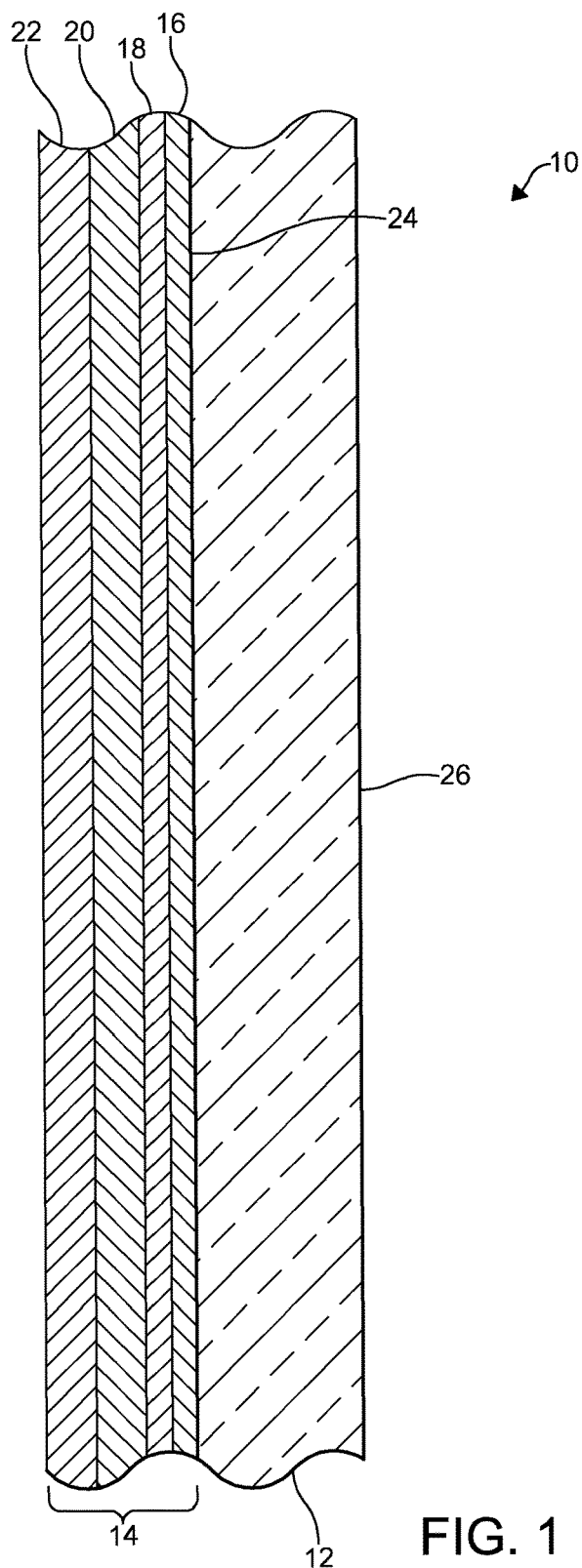
FIG. 1 is a sectional view of a coated glass article in accordance with the invention

It has been discovered to be desirable to have a coated glass article which could conceal a video display by having a mirror-like appearance when the video display is not in use, but can provide improved video image quality when viewed under a broader spectrum of ambient conditions than has heretofore been possible.

The coated reflective glass article of the invention has a predetermined reflectivity. More specifically, the coated reflective glass article has a predetermined level of visible light transmittance and predetermined levels of film side and, in certain embodiments, glass side reflectance which predetermined levels are generally similar to one another.

According to the invention, a coated glass article exhibiting a visible light transmittance of 40%-55% and a film side reflectance of 40%-60% (Illuminant C) has been found to achieve the objectives of providing a pleasant mirror-like appearance when the video display concealed behind the glass is not in use, but also provides an image which is measurably brighter and sharper under certain ambient lighting conditions than with known reflective glasses used for this purpose. The coated glass article may also have a glass side reflectance of 44%-56% (Illuminant C).

It has further been found that the above-stated properties can be achieved according to the invention by a glass substrate over which is deposited a multi-layer film stack of the structure:

an optional base layer of an oxide of silicon, preferably having a thickness from 10 nm to 30 nm deposited over major surface of the glass substrate;

a first coating layer of an oxide of titanium, niobium or chromium preferably having a thickness from 30 nm to 40 nm deposited over the base layer of the oxide of silicon;

a second coating layer of an oxide of silicon preferably having a thickness from 70 nm to 100 nm deposited over the layer of the oxide of titanium, niobium or chromium; and a third layer of an oxide of tin preferably having a thickness of from 60 nm to 90 nm deposited over the second coating layer.

The coated glass article of the invention preferably has a neutral color to an observer viewing the concealed video display at an angle normal to the video display, and desirably exhibits improved neutrality of reflected color when the video display is viewed at non-normal angles to the coated glass surface.

The coated reflective glass article of the invention has a predetermined reflectivity. More specifically, embodiments of the invention provide a reflective coated glass article having a predetermined level of visible light transmittance and predetermined levels of film side, and preferably also glass side reflectance, which predetermined levels are similar to one another.

Glass sheets that have been made reflective by any one of a wide variety of methods are known. It has only been more recently, however that those skilled in the art of thin film coatings have begun experimenting with methods to create new effects using coating stacks of varying numbers of layers and varying the compositions of those layers. One such innovation by Pilkington North America, Inc. is a product sold as Pilkington MirroView™ Pilkington MirroView™ utilizes a multi-layer pyrolytic film stack which has a visible light transmittance (Tvis) of about 20%, a film side reflectance (Rf) of about 70%-75% and a glass side reflectance (Rg) of about 55%-60%. As used herein, visible light transmittance or Tvis means the amount of normally incident light in the visible portion of the spectrum which passes through a sheet of glass of a predetermined thickness. Film side reflectance or Rf means the amount of visible light reflected by the surface of the glass sheet on which (in this case) the multi-layer coating stack has been deposited. Glass side reflectance or Rg means the amount of visible light reflected by the surface of the glass sheet which is uncoated and is opposite the coated surface.

The above-described combination of Tvis and Rf, with the coated surface of the coated glass article facing toward the interior of a room, creates a product which when not illuminated from behind, has a mirror-like appearance. However, when illuminated from behind, visible light from, for example, a video display, allows the video image to be seen through the coated glass article by a viewer in the room. As will be appreciated, while the Pilkington MirroView™ product has been very popular, its Tvis, being on the order of 20%, is quite low, meaning that the brightness of the video image that may be viewed through it may be perceived by some as darker than would be desired. Certain details of the video image may likewise be slightly obscured, thus reducing the "sharpness' of the video image.

"Brightness" as used herein is typically expressed with relation to video displays in terms of luminance. Luminance indicates how much luminous power will be detected by a human eye looking at the surface from a particular angle of view. Luminance can be measured in candela per square meter ($cd/m^2$). "Sharpness" as used herein in connection with video image quality is directly linked to the perceived focus of the image. Sharpness consists of resolution and acutance. Resolution of a video image is generally determined by the number of pixels per unit area. Acutance is the edge contrast of an image which due to the nature of the human visual system makes an image, with higher acutance, appear to be sharper. The perception of a video image of diminished quality with use of the Pilkington MirroView™ product has been found to be emphasized when the room in which the video display is located has relatively high levels of ambient light.

It has been discovered that having a better balance between the levels of Tvis and Rf, in contrast to the approximately 70% Rf and 20% Tvis of the Pilkington MirroView™ product, could improve the quality of the video image viewed through a coated glass substrate, while at the same time, maintaining a sufficient level of concealment and a pleasant mirror-like appearance when the video display not in operation.

Computer modeling was utilized to create predictive examples of a multi-layer thin film coating stack to determine if a manufacturable, cost-effective coating could be formulated to meet the objective of a greater balance between Tvis and Rf, while meeting the above-noted concealment and mirror-like appearance criteria.

The results of these predictive examples of the computer modeling are found in Table 1, in which the following film stacks were modeled over a clear glass substrate:

| | |
|---|---|
| P1 | Glass/15 nm $SiO_2$/32 nm $TiO_2$/90 nm $SiO_2$/75 nm $SnO_2$ |
| P2 | Glass/35 nm $TiO_2$/90 nm $SiO_2$/75 nm $SnO_2$ |
| P3 | Glass/15 nm $SiO_2$/35 nm $TiO_2$/90 nm $SiO_2$/75 nm $SnO_2$ |
| P4 | Glass/15 nm $SiO_2$/35 nm $Nb_2O_5$/90 nm $SiO_2$/75 nm $SnO_2$ |
| P5 | Glass/35 nm $Cr_2O_3$/90 nm $SiO_2$/75 nm $SnO_2$ |
| P6 | Glass/15 nm $SiO_2$/35 nm $Cr_2O_3$/90 nm $SiO_2$/75 nm $SnO_2$ |
| P7 | Glass/15 nm $SiO_2$/35 nm $Cr2O_3$/90 nm $SiO_2$/75 nm $SnO_2$ |
| P8 | Glass/35 nm $Nb_2O_5$/90 nm $SiO_2$/75 nm $SnO_2$ |
| P9 | Glass/15 nm $SiO_2$/35 nm $Nb_2O_5$/90 nm $SiO_2$/75 nm $SnO_2$ |

TABLE 1

Predictive Examples

| Ex. | Tvis | T(a*) | T(b*) | Rf | Rf(a*) | Rf(b*) | Rg | Rg(a*) | Rg(b*) |
|---|---|---|---|---|---|---|---|---|---|
| P1 | 46.9 | 8.7 | 0.9 | 50.9 | −10.4 | −0.9 | 49.2 | −12.0 | −0.9 |
| P2 | 43.1 | 8.8 | −2.9 | 54.1 | −10.3 | 3.1 | 50.6 | −12.6 | 2.3 |
| P3 | 43.3 | 8.7 | −2.3 | 53.9 | −10.4 | 2.5 | 50.4 | −12.7 | 1.8 |
| P4 | 46.2 | 8.4 | −2.9 | 50.8 | −12.1 | −0.7 | 45.8 | −12.3 | 1.4 |
| P5 | 42.4 | 7.8 | −2.1 | 51.0 | −10.6 | 6.1 | 43.5 | −12.3 | 0.7 |
| P6 | 42.6 | 7.6 | −1.6 | 50.9 | −10.7 | 5.8 | 43.2 | −12.4 | 0.1 |
| P7 | 42.0 | 7.4 | 1.8 | 51.0 | −12.4 | −3.1 | 42.7 | −12.3 | −0.7 |
| P8 | 47.3 | 7.9 | −2.9 | 49.6 | −10.3 | 3.2 | 46.2 | −12.3 | 2.1 |
| P9 | 47.6 | 7.8 | −2.3 | 49.2 | −10.4 | 2.4 | 45.8 | −12.3 | 1.4 |

Predictive examples P2, P5, and P8 illustrate that the optional base layer, when provided, has only a very small impact on the optical properties of the coated glass article of the invention.

On-line coating trials were conducted using the computer modeling as a basis. Examples showing the film stack utilized on clear glass in the on-line trials and the measured properties of the coated glass articles are found in Table 2. Conditions during the on-line coating trials included a coater temperature of 1237° F., bath $H_2$ of about 6%, and line speed of 339 inches per minute. Glass thickness was 0.231 inches. Typical coater flows ranged from 438 slm to 647 slm depending on the specific coater measured.

In these examples, the following coated glass articles were produced:
Ex. 1 Glass/15 nm $SiO_2$/32 nm $TiO_2$/90 nm $SiO_2$/75 nm $SnO_2$
Ex. 2-13 Glass/15 nm $SiO_2$/35 nm $TiO_2$/90 nm $SiO_2$/75 nm $SnO_2$

TABLE 2

Coated glass articles produced during on-line trials

| Ex. | Tvis | a* | b* | Rf | a* | b* | Rg | a* | b* |
|---|---|---|---|---|---|---|---|---|---|
| 1 | 45.4 | 8.9 | −0.5 | 53.0 | −10.6 | −0.5 | 50.4 | −12.4 | −1.0 |
| 2 | 42.9 | 9.3 | −0.7 | 55.0 | −10.3 | 0.9 | 52.2 | −12.0 | 0.2 |
| 3 | 45.6 | 9.0 | 0.6 | 52.2 | −10.8 | −0.1 | 49.7 | −12.5 | −0.7 |
| 4 | 44.2 | 9.6 | 2.0 | 53.5 | −11.0 | −1.7 | 50.8 | −12.6 | −2.4 |
| 5 | 43.0 | 9.3 | −0.9 | 55.0 | −10.3 | 1.7 | 52.2 | −12.0 | 0.9 |
| 6 | 45.6 | 9.0 | −0.9 | 52.3 | −10.8 | 1.6 | 49.7 | −12.5 | 0.8 |
| 7 | 43.3 | 9.6 | −2.0 | 54.5 | −10.7 | 2.3 | 51.8 | −12.4 | 1.6 |
| 8 | 42.9 | 9.2 | 0.7 | 55.3 | −10.1 | −0.5 | 52.4 | −11.9 | −0.6 |
| 9 | 44.8 | 8.7 | 1.1 | 53.2 | −10.1 | −1.0 | 50.5 | −11.9 | −1.2 |
| 10 | 42.5 | 9.2 | −3.2 | 55.6 | −10.0 | 3.1 | 52.7 | −11.9 | 2.5 |
| 11 | 44.2 | 9.0 | −0.8 | 54.0 | −10.2 | 0.7 | 51.1 | −12.1 | 0.4 |
| 12 | 46.0 | 8.4 | −0.4 | 51.9 | −10.2 | 0.4 | 49.2 | −11.9 | 0.0 |
| 13 | 44.6 | 8.7 | −0.9 | 53.6 | −10.1 | 1.7 | 50.8 | −11.9 | 1.1 |

According to the invention, a film stack deposited on a major surface of a glass sheet, the glass preferably being a clear soda-lime-silica glass and preferably of a thickness between 3 mm-6 mm, may have a base layer of an oxide of silicon preferably at a thickness from 10 nm to 30 nm deposited over the major surface of the glass sheet, a first coating layer of an oxide of titanium, niobium or chromium preferably at a thickness from 30 nm to 40 nm deposited over the surface of the base layer, a second coating layer of an oxide of silicon preferably at a thickness of 70 nm to 100 nm deposited over the first coating layer, and a third coating layer of an oxide of tin preferably at a thickness from 60 nm to 90 nm deposited over the second coating layer.

In certain preferred embodiments, the thicknesses of the layers of the film stack are in the range for the base layer of an oxide of silicon of from 15 nm to 25 nm, for the first coating layer of the oxide of titanium, niobium or chromium of from 32 nm to 37 nm, for the second coating layer of the oxide of silicon of from 80 nm to 95 nm, and for the third coating layer of the oxide of tin of from 70 nm to 80 nm. Even more preferably, the thicknesses of the layers of the film stack are in the range for the base layer of from 15 nm to 20 nm, for the first coating layer of from 34 nm to 36 nm, for the second coating layer of from 87 nm to 92 nm, and for the third coating layer of from 73 nm to 77 nm.

In embodiments of the invention, the first coating layer has a refractive index of 2.1 or more, the second coating layer has a refractive index of 1.6 or less, and the third coating layer has a refractive index of more than 1.6.

In certain embodiments, the coated glass article exhibits a transmitted color (Tvis) in the range a*=+5 to 12, b*=−5 to +5 and reflected film-side color (Rf) in the range a*=−2 to −8, b*=−6 to +10, and preferably also glass-side reflected color (Rg) is in the range a*=−15 to −8, b*=−6 to +10, according to the CIELAB color coordinate system.

FIG. 1 illustrates certain embodiments of the coated glass article 10.

As illustrated in FIG. 1, the coated glass article 10 comprises a glass substrate 12. The glass substrate 12 may be of any of the conventional glass compositions known in the art. In certain embodiments, the composition of the glass substrate 12 is selected to allow the coated glass article 10 to exhibit certain specific spectral properties. The glass substrate 12 may be substantially clear and transparent to visible light. Preferably, the glass substrate 12 is a soda-lime-silica glass. In this embodiment, the substrate 12 may be a float glass ribbon. However, the glass substrate may be of another composition such as, for example, a borosilicate composition. Also, the transparency or absorption characteristics of the glass substrate may vary between embodiments of the coated glass article. For example, a tinted glass substrate may be utilized in the coated glass article. Additionally, the glass substrate thickness may vary between embodiments.

A coating 14 is deposited over the glass substrate 12. The coating 14 comprises the optional base coating layer 16, the first coating layer 18, the second coating layer 20, and the third coating layer 22. In certain embodiments, the coating 14 consists of the aforementioned layers 16-22. The layers 16-22 may be deposited by any suitable method but are preferably deposited by atmospheric chemical vapor deposition (APCVD). Other known deposition methods are suitable for depositing one or more of the coating layers such as, for example, sol-gel coating techniques or sputter coating techniques. In embodiments where the substrate 12 is a float glass ribbon, the coating 14 is preferably applied in the heated zone of the float glass process. The base coating layer 16 is deposited over and, preferably, directly on, a first major surface 24 of the glass substrate 12. A second major surface 26 of the glass substrate may be uncoated.

In addition, in certain embodiments of the invention, other optional layers may be added to the coating stack depending upon the specific application. For example, a color suppression layer may be deposited on the major glass surface prior to the deposition of the base layer of an oxide of silicon.

The materials chosen for the layers of the film stack according to the invention are chosen for not only their optical properties, e.g. refractive index, but also for their physical and chemical properties.

The Tvis of the coated glass article is 40%-50%, preferably 45%-47%, while the Rf is 40%-60%, preferably 50%-60%, and more preferably 50%-55%. In addition, in certain embodiments the Rg exhibited by the coated glass article is 44%-56%, and preferably 49%-51%. Particularly when Tvis and Rf are in the preferred ranges just described, an image of a video display viewed through the coated glass sheet has been found to be measurably brighter and sharper under a broader range of ambient lighting conditions than such an image viewed through known reflective glasses.

The layers of the multi-layer film coating stack can be deposited by any suitable method, but preferably are deposited by chemical vapor deposition, more preferably atmospheric pressure chemical vapor deposition (APCVD) during a float glass manufacturing process. Deposition rates of each of the layers of the multi-layer film stack can be any deposition rate sufficient to allow production of the film stack in a cost-effective manner.

The optional base layer of an oxide of silicon is preferably provided in certain embodiments where, depending upon the material forming the first coating layer and the manner in which the first coating layer is deposited, it may be beneficial in enhancing the deposition of the first coating layer. This may be the case in certain embodiments where the first coating layer is formed of an oxide of titanium. The optional base layer, if provided, has only a very small impact on the optical properties of the coated glass article of the invention.

Precursor materials which could be utilized to form the layers of the oxide of silicon could include: silanes or phosphorous compounds of Si, but are preferably silanes, and are more preferably a monosilane. Precursor materials which could be utilized to form the layer of the oxide of titanium, niobium or chromium include: titanium halide compounds, titanium alkoxides, and titanium amines, niobium halide compounds and niobium alkoxides, chromium oxyhalide compounds and chromium alkoxides. Preferred titanium compounds include TiCl4, preferred niobium compounds include NbCl5 and preferred chromium compounds include CrOCl2. Precursor materials which could be utilized to form the layer of the oxide of tin include: inorganic tin halide compounds, but is preferably an organotin compound such as monobutyltin trichloride (MBTC), more preferably the tin precursor is dimethyltin dichloride (DMT).

A float glass operation is utilized as a means for practicing the method of the claimed invention. One specific example of a float glass operation is hereinafter described. The float glass apparatus more particularly comprises a canal section along which molten glass is delivered from a melting furnace, to a float bath section wherein a continuous glass ribbon is formed in accordance with the well-known float process. The glass ribbon advances from the bath section through an adjacent annealing lehr and a cooling section. The continuous glass ribbon serves as the substrate upon which the desired coating is deposited in accordance with the present invention.

The float bath section includes a bottom section within which a bath of molten tin is contained, a roof, opposite side walls, and end walls. The roof, side walls, and end walls together define an enclosure in which a non-oxidizing atmosphere is maintained to prevent oxidation of the molten tin.

Additionally, gas distributor beams in the bath section may be employed to apply additional coatings onto the substrate, prior to applying the metal oxide coating by the method of the claimed invention of the present application.

In operation, the molten glass flows along the channel beneath a regulating tweel and downwardly onto the surface of the tin bath in controlled amounts. On the tin bath the molten glass spreads laterally under the influences of gravity and the surface tension, as well as certain mechanical influences, and it is advanced across the bath to form the ribbon. The ribbon is removed over lift out rolls and is thereafter conveyed through the annealing lehr and the cooling section on aligned rolls. The application of the coating of the claimed invention may take place in the float bath section, or further along the production line, for example, in the gap between the float bath and the annealing lehr, or in the annealing lehr.

A suitable non-oxidizing atmosphere, generally nitrogen, or a mixture of nitrogen and hydrogen in which nitrogen predominates, is maintained in the bath enclosure to prevent oxidation of the tin bath. The atmosphere gas is admitted through conduits operably coupled to a distribution manifold. The non-oxidizing gas is introduced at a rate sufficient to compensate for normal losses and maintain a slight positive pressure, on the order of about 0.001 to about 0.01 atmospheres above ambient atmospheric pressure, so as to prevent infiltration of outside atmosphere. For purposes of the claimed invention the above-noted pressure range is considered to constitute normal atmospheric pressure. Heat for maintaining the desired temperature regime, generally 600° C.-750° C., in the tin bath and the enclosure may be provided by radiant heaters within the enclosure. The atmosphere within the lehr is typically atmospheric air, as the cooling section is not enclosed and the glass ribbon is open to the ambient atmosphere. Ambient air may be directed against the glass ribbon, for example, by fans, in the cooling section. Heaters may also be provided within the annealing lehr for causing the temperature of the glass ribbon to be gradually reduced in accordance with a predetermined regime as it is conveyed therethrough.

Gas distributor beams are generally positioned in the float bath to deposit the various coatings on the glass ribbon substrate but might be positioned downstream of the float bath. The gas distributor beam is one form of reactor that can be employed in practicing the process of the present invention.

A conventional configuration for the distributor beams suitable for supplying the precursor materials in accordance with the invention is, generally, an inverted generally channel-shaped framework formed by spaced inner and outer walls and defining at least two enclosed cavities. A suitable heat exchange medium is circulated through the enclosed cavities in order to maintain the distributor beams at a desired temperature. A preferred distributor beam is disclosed in U.S. Pat. No. 4,504,526 to Hofer et al., which is incorporated herein by reference.

The precursor gas mixture is supplied through a fluid-cooled supply conduit. The supply conduit extends along the distributor beam and admits the gas through drop lines spaced along the supply conduit. The supply conduit leads to a delivery chamber within a header carried by the framework. Precursor gases admitted through the drop lines are discharged from the delivery chamber through a passageway toward a coating chamber defining a vapor space opening onto the glass where they flow along the surface of the glass.

Baffle plates may be provided within the delivery chamber for equalizing the flow of precursor materials across the distributor beam to assure that the materials are discharged against the glass in a smooth, laminar, uniform flow entirely across the distributor beam. Spent precursor materials are collected and removed through exhaust chambers along the sides of the distributor beam.

Various forms of distributor beams used for chemical vapor deposition are suitable for the present method and are known in the prior art. One such alternative distributor beam configuration generally introduces the precursor gas mixture through a gas supply duct where it is cooled by cooling fluid circulated through cooling ducts. The gas supply duct opens through an elongated aperture into a gas flow restrictor. The glass flow restrictor comprises a plurality of metal strips longitudinally crimped in the form of a sine wave and vertically mounted in abutting relationship with one another extending along the length of the distributor. Adjacent crimped metal strips are arranged "out of phase" to define a plurality of vertical channels between them. These vertical channels are of small cross-sectional area relative to the cross-sectional area of the gas supply duct, so that the gas is released from the glass flow restrictor at substantially constant pressure along the length of the distributor.

The coating gas is released from the gas flow restrictor into the inlet side of a substantially U-shaped guide channel generally comprising an inlet leg, a coating chamber which opens onto the hot glass substrate to be coated, and an exhaust leg, whereby used coating gas is withdrawn from the glass. The rounded corners of the blocks defining the coating channel promote a uniform laminar flow of coating parallel to the glass surface across the glass surface to be coated.

It has been found that having a more balanced relationship between Tvis, Rf and Rg surprisingly produces a more visually pleasant mirror-like appearance than when Rf is significantly higher as with the Pilkington MirroView™ product discussed elsewhere herein. It will be appreciated that the reflected color perceived by a viewer whether the video display is in operation or not will play a role in the acceptability of the appearance of the video image of the reflective mirror. Generally, a neutral color is preferred. The reflected color of the coated article is according to the invention is generally perceived as neutral to slightly bluish as described previously in this application.

It will be appreciated that the reflective coated glass article according to the invention can be used for a variety of applications.

Figure 2:
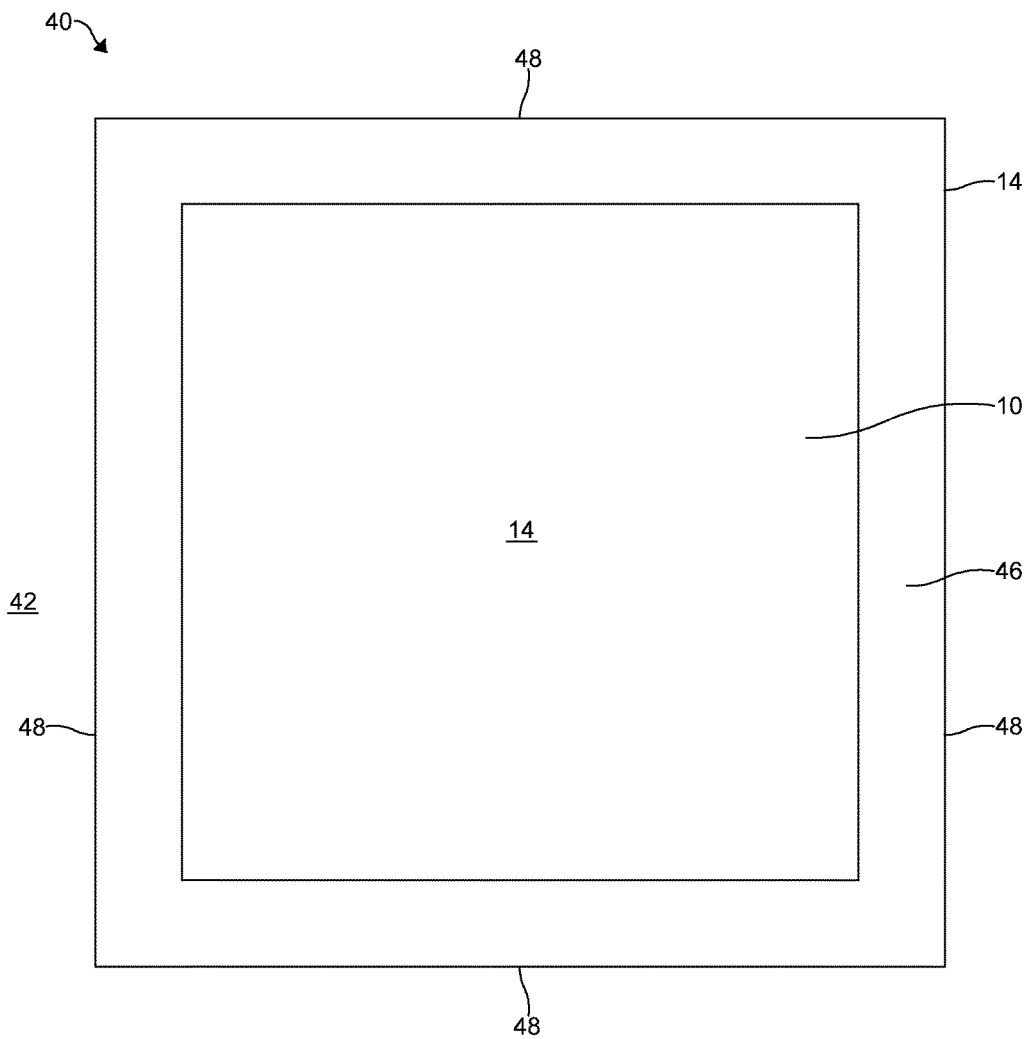
FIG. 2 is a plan view of a display assembly in accordance with the invention.

Referring to FIG. 2, in certain embodiments, the coated glass article 10 is utilized in the display assembly 40. Preferably, the display assembly 40 is attached to a mounting member 42 such as, for example, a wall. A display such as, for example, a flat screen video display may also be attached to the mounting member 42 and/or the display assembly 40. The display is provided between the mounting member 42 and the display assembly 40. Advantageously, in this position, the display is concealed by the reflectance and mirror-like appearance of the coated glass article 10 of the display assembly 40 when the display is not in use and, when the display is in use, a display image can be seen through the coated glass article 10 and the quality of the display image showing through the display assembly 40 is bright and sharp under a broad spectrum of ambient light conditions.

Thus, in embodiments of the invention, a method of making a video display assembly is provided in which a video display is mounted behind a coated glass article of the invention, such that when the video display is in operation it is visible through the coated glass article and when the video display is not in operation is it concealed by the coated glass article.

The display assembly 40 also comprises a frame member 44. The coated glass article 10 is provided within and, preferably, secured to the frame member 44. Within the frame member 44, the coated glass article 10 is positioned so that the coating 14 may face out and away from the mounting member 42. In other embodiments (not depicted), the coated glass article is positioned within the frame member so that the coating faces the mounting member.

The frame member 44 can be formed of wood, metal, plastic or another suitably rigid material. In certain embodiments like the one shown in FIG. 2, the frame member 44 has an outer surface 46 that is substantially square-shaped. In this embodiment, the frame member 44 comprises four rails 48 and each rail 48 is attached to a pair of rails and is provided in a perpendicular relationship with the pair of rails attached thereto. However, in other embodiments (not depicted), the frame member may have an outer surface which is of another geometric shape and/or comprise more or less than four rails.

In accordance with the provisions of the patent statutes, the present invention has been described in what is considered to represent its preferred embodiments. However, it should be noted that the invention can be practiced otherwise than is specifically illustrated and described without departing from its spirit or scope.

The invention claimed is:

1. A coated glass article comprising a glass substrate and a coating formed over the glass substrate, wherein the coating comprises:
   optionally, a base layer of an oxide of silicon deposited over a major surface of the glass substrate;
   a first coating layer of an oxide of titanium, niobium or chromium deposited over the optional base layer;
   a second coating layer of an oxide of silicon deposited over the first coating layer; and
   a third coating layer of an oxide of tin deposited over the second coating layer;
   wherein the coated glass article exhibits a Tvis of 40%-55% and an Rf of 40%-60%.

2. The coated glass article defined in claim 1, comprising the base layer of an oxide of silicon is deposited at a thickness of from 10 nm to 30 nm.

3. The coated glass article defined in claim 1, wherein the first coating layer is deposited at a thickness of from 30 nm to 40 nm.

4. The coated glass article defined in claim 1, wherein the second coating layer is deposited at a thickness of from 70 nm to 100 nm.

5. The coated glass article defined in claim 1, wherein the third coating layer is deposited at a thickness of from 60 nm to 90 nm.

6. The coated glass article defined in claim 1, wherein the coated glass article exhibits an Rg of 44%-56%.

7. The coated glass article defined in claim 1, wherein the coated glass article exhibits a Tvis of 45%-47% and an Rf of 50%-60%.

8. The coated glass article defined in claim 1, wherein the coated glass article exhibits transmitted color in the range $a^*$=+5 to 12 and $b^*$=−5 to +5, reflected film-side color in the range $a^*$=−12 to −8 and $b^*$=−6 to +10 according to the CIELAB color coordinate system.

9. The coated glass article defined in claim 1, wherein each of the layers of the coating stack is deposited by chemical vapor deposition.

10. The coated glass article defined in claim 1, comprising the base layer and further comprising a color suppression coating is deposited between the base layer and the glass sheet.

11. The coated glass article defined in claim 1, wherein the first coating layer has a refractive index of 2.1 or more, the second coating layer has a refractive index of 1.6 or less, and the third coating layer has a refractive index of more than 1.6.

12. A method of making a coated glass article as defined in claim 1 comprising sequentially depositing each of the layers of the coating by chemical vapor deposition.

13. A video display assembly comprised of a frame member mounted about a coated glass article as defined in claim 1.

14. A method of making a video display assembly comprising mounting a video display behind a coated glass article as defined in claim 1, such that when the video display is in operation it is visible through the coated glass article and when the video display is not in operation is it concealed by the coated glass article.

* * * * *